(12) United States Patent
Carlson et al.

(10) Patent No.: US 9,688,050 B2
(45) Date of Patent: Jun. 27, 2017

(54) PANEL STRUCTURE

(75) Inventors: David Carlson, Rochester Hills, MI (US); Brandon Madaus, Shelby Township, MI (US); Matthew Harthcock, Oakland Township, MI (US); Kearney Barton, Oak Island, NC (US); Charles L. Taylor, Arlington, TX (US); Jason Walker, Lenox, MI (US)

(73) Assignee: ZEPHYROS, INC., Romeo, MI (US)

( * ) Notice: Subject to any disclaimer, the term of this patent is extended or adjusted under 35 U.S.C. 154(b) by 295 days.

(21) Appl. No.: 13/292,686

(22) Filed: Nov. 9, 2011

(65) Prior Publication Data

US 2012/0048451 A1    Mar. 1, 2012

Related U.S. Application Data

(63) Continuation of application No. 11/151,957, filed on Jun. 14, 2005, now Pat. No. 8,070,994.
(Continued)

(51) Int. Cl.
*B32B 37/02* (2006.01)
*B32B 37/26* (2006.01)
(Continued)

(52) U.S. Cl.
CPC ............ *B32B 3/12* (2013.01); *B29C 44/1228* (2013.01); *B29C 44/186* (2013.01); *B32B 5/18* (2013.01); *B32B 5/20* (2013.01); *B32B 7/02* (2013.01); *E04C 2/365* (2013.01); *B29K 2995/0002* (2013.01); *B29L 2031/776* (2013.01); *B32B 2250/40* (2013.01); *B32B 2262/0261* (2013.01); *B32B 2262/101* (2013.01); *B32B 2262/106* (2013.01); *B32B 2307/102* (2013.01); *B32B 2307/304* (2013.01); *B32B 2307/732* (2013.01);
(Continued)

(58) Field of Classification Search
CPC ............ B29C 44/1228; B29C 44/186; B29K 2995/0002; B29L 2031/776; B32B 2605/00; B32B 3/12; B32B 5/18; B32B 5/20; B32B 7/02
USPC ....................................... 264/46.5
See application file for complete search history.

(56) References Cited

U.S. PATENT DOCUMENTS 2,744,042 A * 5/1956 Pace ........................... 264/46.5
3,249,659 A   5/1966 Voelker
(Continued)

FOREIGN PATENT DOCUMENTS

DE    199 19 783    11/2000
EP    0 442 178    2/1990
(Continued)

OTHER PUBLICATIONS

"The Epoxy Book", Published by System Three Resins, Inc. Seattle, Washington.
(Continued)

*Primary Examiner* — Robert J Grun
(74) *Attorney, Agent, or Firm* — The Dobrusin Law Firm P.C.

(57) ABSTRACT

A panel structure and a method of forming the panel structure are disclosed. The panel structure typically includes at least one panel associated with a material. The panel structure has been found particularly advantageous for use as an interior panel of an airplane.

18 Claims, 5 Drawing Sheets

Related U.S. Application Data

(60) Provisional application No. 60/581,190, filed on Jun. 18, 2004.

(51) Int. Cl.

| | | |
|---|---|---|
| *B32B 37/06* | (2006.01) | |
| *B32B 3/12* | (2006.01) | |
| *B29C 44/12* | (2006.01) | |
| *B29C 44/18* | (2006.01) | |
| *B32B 5/18* | (2006.01) | |
| *B32B 5/20* | (2006.01) | |
| *B32B 7/02* | (2006.01) | |
| *E04C 2/36* | (2006.01) | |
| *B29L 31/00* | (2006.01) | |

(52) U.S. Cl.
CPC ....... *B32B 2419/00* (2013.01); *B32B 2439/00* (2013.01); *B32B 2479/00* (2013.01); *B32B 2509/00* (2013.01); *B32B 2605/00* (2013.01); *Y10T 428/24157* (2015.01)

(56) References Cited

U.S. PATENT DOCUMENTS

| | | |
|---|---|---|
| 4,049,855 A | 9/1977 | Cogan |
| 4,234,648 A * | 11/1980 | Patz et al. ................. 442/229 |
| 4,273,818 A | 6/1981 | Buchs |
| 4,291,079 A | 9/1981 | Hom |
| 4,294,329 A | 10/1981 | Rose et al. |
| 4,318,453 A | 3/1982 | Rose et al. |
| 4,348,442 A | 9/1982 | Figge |
| 4,421,201 A | 12/1983 | Nelson et al. |
| 4,421,811 A | 12/1983 | Rose et al. |
| 4,427,481 A | 1/1984 | Smith et al. |
| 4,476,183 A | 10/1984 | Holtrop et al. |
| 4,538,380 A | 9/1985 | Colliander |
| 4,541,879 A | 9/1985 | Riel |
| 4,557,961 A | 12/1985 | Gorges |
| 4,601,769 A | 7/1986 | DeHoff |
| 4,693,775 A | 9/1987 | Harrison |
| 4,724,243 A | 2/1988 | Harrison |
| 4,749,434 A | 6/1988 | Harrison |
| 4,757,665 A | 7/1988 | Hardigg |
| 4,769,166 A | 9/1988 | Harrison |
| 4,778,845 A | 10/1988 | Tschan et al. |
| 4,871,590 A | 10/1989 | Merz et al. |
| 4,898,630 A | 2/1990 | Kitoh et al. |
| 4,908,273 A | 3/1990 | Urech et al. |
| 4,922,596 A | 5/1990 | Wycech |
| 4,923,902 A | 5/1990 | Wycech |
| 4,978,562 A | 12/1990 | Wycech |
| 4,995,545 A | 2/1991 | Wycech |
| 4,996,090 A | 2/1991 | Steinke et al. |
| 5,037,498 A | 8/1991 | Umeda |
| 5,124,186 A | 6/1992 | Wycech |
| 5,212,003 A | 5/1993 | Homer |
| 5,238,725 A | 8/1993 | Effing et al. |
| 5,242,637 A | 9/1993 | Inoue et al. |
| 5,266,133 A | 11/1993 | Hanley et al. |
| 5,274,006 A | 12/1993 | Kagoshima et al. |
| 5,328,744 A | 7/1994 | Kaufmann et al. |
| 5,338,594 A | 8/1994 | Wang et al. |
| 5,342,873 A | 8/1994 | Merz et al. |
| 5,382,606 A | 1/1995 | Butikofer |
| 5,445,861 A | 8/1995 | Newton et al. |
| 5,470,886 A | 11/1995 | Makhlouf et al. |
| 5,475,039 A | 12/1995 | Butikofer |
| 5,648,401 A | 7/1997 | Czaplicki et al. |
| 5,653,836 A | 8/1997 | Mnich et al. |
| 5,712,317 A | 1/1998 | Makhlouf et al. |
| 5,763,813 A | 6/1998 | Cohen et al. |
| 5,783,272 A | 7/1998 | Wong |
| 5,841,079 A | 11/1998 | Parente |
| 5,884,960 A | 3/1999 | Wycech |
| 5,894,071 A | 4/1999 | Merz et al. |
| 5,932,680 A | 8/1999 | Heider |
| 5,942,330 A | 8/1999 | Kelley et al. |
| 5,948,508 A | 9/1999 | Pastore et al. |
| 5,964,979 A | 10/1999 | George et al. |
| 5,980,174 A | 11/1999 | Gallagher et al. |
| 5,985,435 A | 11/1999 | Czaplicki et al. |
| 5,994,422 A | 11/1999 | Born et al. |
| 6,004,425 A | 12/1999 | Born et al. |
| 6,030,701 A | 2/2000 | Johnson et al. |
| 6,039,287 A | 3/2000 | Liston et al. |
| 6,039,832 A | 3/2000 | McCarville |
| 6,040,350 A | 3/2000 | Fukui |
| 6,057,382 A | 5/2000 | Karim et al. |
| 6,077,884 A | 6/2000 | Hess et al. |
| 6,093,468 A | 7/2000 | Toms et al. |
| 6,096,791 A | 8/2000 | Born et al. |
| 6,103,784 A | 8/2000 | Hilborn et al. |
| 6,110,567 A | 8/2000 | Bird |
| 6,133,335 A | 10/2000 | Mahoney et al. |
| 6,136,398 A | 10/2000 | Willett et al. |
| 6,136,944 A | 10/2000 | Stewart et al. |
| 6,153,302 A | 11/2000 | Karim et al. |
| 6,158,690 A | 12/2000 | Wadey et al. |
| 6,162,504 A | 12/2000 | Hubert et al. |
| 6,173,807 B1 | 1/2001 | Welch et al. |
| 6,174,932 B1 | 1/2001 | Pachl et al. |
| 6,179,086 B1 | 1/2001 | Bansemir et al. |
| 6,179,943 B1 | 1/2001 | Welch et al. |
| 6,180,206 B1 | 1/2001 | Kain, Jr. |
| 6,182,787 B1 | 2/2001 | Kraft et al. |
| 6,187,411 B1 | 2/2001 | Palmer |
| 6,218,442 B1 | 4/2001 | Hilborn et al. |
| 6,220,388 B1 | 4/2001 | Sanborn |
| 6,228,449 B1 | 5/2001 | Meyer |
| 6,232,433 B1 | 5/2001 | Narayan |
| 6,235,842 B1 | 5/2001 | Kuwano et al. |
| 6,263,635 B1 | 7/2001 | Czaplicki |
| 6,277,898 B1 | 8/2001 | Pachl et al. |
| 6,287,669 B1 | 9/2001 | George et al. |
| 6,298,633 B1 | 10/2001 | McCorkle et al. |
| 6,303,672 B1 | 10/2001 | Papalos et al. |
| 6,312,668 B2 | 11/2001 | Mitra et al. |
| 6,319,964 B1 | 11/2001 | Blank et al. |
| 6,348,513 B1 | 2/2002 | Hilborn et al. |
| 6,350,791 B1 | 2/2002 | Feichtmeier et al. |
| 6,376,564 B1 | 4/2002 | Harrison |
| 6,403,222 B1 | 6/2002 | Harrison |
| 6,405,978 B1 | 6/2002 | Dean et al. |
| 6,419,305 B1 | 7/2002 | Larsen |
| 6,429,244 B1 | 8/2002 | Rinka et al. |
| 6,432,475 B1 | 8/2002 | Yamamoto et al. |
| 6,437,055 B1 | 8/2002 | Moriarity et al. |
| 6,439,340 B1 | 8/2002 | Shirvan |
| 6,440,257 B1 | 8/2002 | Zhou et al. |
| 6,441,075 B2 | 8/2002 | Hirata et al. |
| 6,441,081 B1 | 8/2002 | Sadatoshi et al. |
| 6,444,149 B1 | 9/2002 | Valentinsson |
| 6,444,713 B1 | 9/2002 | Pachl et al. |
| 6,448,338 B1 | 9/2002 | Born et al. |
| 6,451,231 B1 | 9/2002 | Harrison et al. |
| 6,451,876 B1 | 9/2002 | Koshy |
| 6,455,146 B1 | 9/2002 | Fitzgerald |
| 6,455,476 B1 | 9/2002 | Imai et al. |
| 6,467,834 B1 | 10/2002 | Barz et al. |
| 6,471,285 B1 | 10/2002 | Czaplicki et al. |
| 6,479,560 B2 | 11/2002 | Freitag et al. |
| 6,482,486 B1 | 11/2002 | Czaplicki et al. |
| 6,486,256 B1 | 11/2002 | Tarbutton et al. |
| 6,506,494 B2 | 1/2003 | Brandys et al. |
| 6,511,411 B1 | 1/2003 | Brown |
| 6,518,347 B1 | 2/2003 | Boyd et al. |
| 6,537,413 B1 | 3/2003 | Hochet et al. |
| 6,548,593 B2 | 4/2003 | Merz et al. |
| 6,551,441 B1 | 4/2003 | Sato et al. |
| 6,561,571 B1 | 5/2003 | Brennecke |
| 6,565,942 B2 | 5/2003 | Anderson et al. |
| 6,573,309 B1 | 6/2003 | Reitenbach et al. |
| 6,607,831 B2 | 8/2003 | Ho et al. |

(56) References Cited

U.S. PATENT DOCUMENTS

| | | |
|---|---|---|
| 6,611,659 B2 | 8/2003 | Meisiek |
| 6,617,366 B2 | 9/2003 | Sueda et al. |
| 6,620,501 B1 | 9/2003 | Kassa et al. |
| 6,667,089 B1 | 12/2003 | Barker |
| 6,668,457 B1 | 12/2003 | Czaplicki |
| 6,670,291 B1 | 12/2003 | Tompkins et al. |
| 6,682,818 B2 | 1/2004 | Czaplicki et al. |
| 6,706,772 B2 | 3/2004 | Czaplicki et al. |
| 6,730,713 B2 | 5/2004 | Czaplicki |
| 6,740,379 B1 | 5/2004 | Congard |
| 6,740,399 B1 | 5/2004 | George et al. |
| 6,753,379 B1 | 6/2004 | Kawate et al. |
| 6,774,171 B2 | 8/2004 | Kassa |
| 6,776,869 B1 | 8/2004 | Schenkel |
| 6,777,079 B2 | 8/2004 | Zhou et al. |
| 6,787,065 B1 | 9/2004 | Schapira et al. |
| 6,787,579 B2 | 9/2004 | Czaplicki et al. |
| 6,787,593 B2 | 9/2004 | Bell et al. |
| 6,787,605 B2 | 9/2004 | Clough et al. |
| 6,787,606 B1 | 9/2004 | Chen |
| 6,790,597 B2 | 9/2004 | Dershem et al. |
| 6,790,906 B2 | 9/2004 | Chaignon et al. |
| 6,797,371 B1 | 9/2004 | Gehlsen et al. |
| 6,800,157 B2 | 10/2004 | Tarbutton et al. |
| 6,800,680 B2 | 10/2004 | Stark et al. |
| 6,805,768 B2 | 10/2004 | Agarwal et al. |
| 6,806,320 B2 | 10/2004 | Everaerts et al. |
| 6,811,864 B2 | 11/2004 | Czaplicki et al. |
| 6,820,192 B2 | 11/2004 | Cho et al. |
| 6,820,337 B2 | 11/2004 | Buge et al. |
| 6,838,509 B2 | 1/2005 | Shimo et al. |
| 6,846,559 B2 | 1/2005 | Czaplicki et al. |
| 6,855,393 B1 | 2/2005 | Ayres |
| 6,860,186 B2 | 3/2005 | Cohen |
| 6,862,863 B2 | 3/2005 | McCorkle et al. |
| 6,884,055 B2 | 4/2005 | Cox |
| 6,884,854 B2 | 4/2005 | Schoenfeld et al. |
| 6,887,914 B2 | 5/2005 | Czaplicki et al. |
| 6,890,964 B2 | 5/2005 | Czaplicki et al. |
| 6,893,733 B2 | 5/2005 | Obeshaw |
| 6,894,082 B2 | 5/2005 | Brantl et al. |
| 6,911,109 B2 | 6/2005 | Giroux et al. |
| 2002/0009582 A1 | 1/2002 | Golden |
| 2002/0070074 A1 | 6/2002 | Bongiovi |
| 2002/0119331 A1 | 8/2002 | Jiang |
| 2002/0120064 A1 | 8/2002 | Khandpur et al. |
| 2002/0123575 A1 | 9/2002 | Kato et al. |
| 2002/0136891 A1 | 9/2002 | Khandpur et al. |
| 2002/0137808 A1 | 9/2002 | Gehlsen et al. |
| 2003/0040598 A1 | 2/2003 | Wang |
| 2003/0187129 A1 | 10/2003 | Bell et al. |
| 2004/0033324 A1 | 2/2004 | Meyer |
| 2004/0063800 A1 | 4/2004 | Brantl et al. |
| 2004/0079478 A1 | 4/2004 | Merz |
| 2004/0131839 A1 | 7/2004 | Eagle |
| 2004/0131840 A1 | 7/2004 | Ferguson et al. |
| 2004/0180193 A1 | 9/2004 | Oda et al. |
| 2004/0181013 A1 | 9/2004 | Schenkel |
| 2004/0197545 A1 | 10/2004 | Gehlsen et al. |
| 2004/0202881 A1 | 10/2004 | Everaerts et al. |
| 2004/0229000 A1 | 11/2004 | Khandpur et al. |
| 2004/0234774 A1 | 11/2004 | Cheng et al. |
| 2004/0253407 A1* | 12/2004 | Shah ............... B32B 3/12 428/73 |
| 2004/0266898 A1 | 12/2004 | Kassa et al. |
| 2005/0016677 A1 | 1/2005 | Carlson et al. |
| 2005/0020703 A1 | 1/2005 | Czaplicki et al. |
| 2005/0048276 A1 | 3/2005 | Wilson |
| 2005/0154089 A1 | 7/2005 | Taylor et al. |
| 2005/0159511 A1 | 7/2005 | Kramer |
| 2005/0159531 A1 | 7/2005 | Ferng et al. |

FOREIGN PATENT DOCUMENTS

| | | |
|---|---|---|
| EP | 0 360 214 | 3/1990 |
| EP | 0 819 723 | 1/1998 |
| EP | 1 022 320 | 7/2000 |
| EP | 1 055 699 | 11/2000 |
| EP | 1 123 184 B1 | 12/2002 |
| EP | 0 703 931 | 10/2003 |
| EP | 1 240 266 | 2/2004 |
| EP | 0 851 894 | 4/2004 |
| EP | 1 272 587 | 5/2004 |
| EP | 1 155 084 | 6/2004 |
| EP | 1 431 325 | 6/2004 |
| EP | 1 075 498 | 7/2004 |
| EP | 0 820 491 | 8/2004 |
| EP | 0 947 529 | 8/2004 |
| EP | 1 185 595 | 8/2004 |
| EP | 1 252 217 | 8/2004 |
| EP | 1 449 868 | 8/2004 |
| EP | 1 023 413 | 9/2004 |
| EP | 1 155 082 | 9/2004 |
| EP | 1 305 376 | 9/2004 |
| EP | 1 155 053 | 10/2004 |
| EP | 1 163 308 | 10/2004 |
| EP | 1 471 105 | 10/2004 |
| EP | 1 001 893 | 11/2004 |
| EP | 1 115 770 | 11/2004 |
| EP | 1 187 888 | 11/2004 |
| EP | 1 574 537 | 9/2005 |
| GB | 1 265 489 | 3/1972 |
| GB | 1 291 753 | 10/1972 |
| JP | 56-004432 | 1/1981 |
| JP | 57-117542 | 7/1982 |
| JP | 4059819 | 2/1992 |
| JP | 4059820 | 2/1992 |
| JP | 9249730 | 9/1997 |
| WO | 95/33785 | 12/1995 |
| WO | 97/02967 | 1/1997 |
| WO | 97/12929 | 4/1997 |
| WO | 97/19124 | 5/1997 |
| WO | 98/52997 | 11/1998 |
| WO | 9902578 | 1/1999 |
| WO | 00/12571 | 3/2000 |
| WO | 00/12595 | 3/2000 |
| WO | 00/13876 | 3/2000 |
| WO | 00/20483 | 4/2000 |
| WO | 00/37242 | 6/2000 |
| WO | 00/37554 | 6/2000 |
| WO | 00/39232 | 7/2000 |
| WO | 00/40629 | 7/2000 |
| WO | 00/52086 | 9/2000 |
| WO | 01/57130 | 8/2001 |
| WO | 01/88033 | 11/2001 |
| WO | 02/070620 | 9/2002 |
| WO | 02/088214 | 11/2002 |
| WO | 03/011954 | 2/2003 |
| WO | 03/040251 | 5/2003 |
| WO | 03/054069 | 7/2003 |
| WO | 03/059997 | 7/2003 |
| WO | 03/072677 | 9/2003 |
| WO | 03/078163 | 9/2003 |
| WO | 03/095575 | 11/2003 |
| WO | 2004/050740 | 6/2004 |
| WO | 2004/055092 | 7/2004 |
| WO | 2004/060956 | 7/2004 |
| WO | 2004/060984 | 7/2004 |
| WO | 2004/062869 | 7/2004 |
| WO | 2004/065485 | 8/2004 |
| WO | 2004/076507 | 9/2004 |
| WO | 2004/085510 | 10/2004 |
| WO | 2004/085564 | 10/2004 |
| WO | 2004/099312 | 11/2004 |
| WO | 2004/104125 | 12/2004 |
| WO | 2005/007720 | 1/2005 |

(56) References Cited

FOREIGN PATENT DOCUMENTS

| WO | 2005/035217 | 4/2005 |
|---|---|---|
| WO | 2005/047393 | 5/2005 |

OTHER PUBLICATIONS

"Expoxy Resins" Second Edition Encyclopedia of Polymer Science and Engineering, vol. 6, pp. 322-383 (1985).
Born et al., "Structural Bonding in Automotive Applications".
Dvorko, "One-Part Epoxy Compounds and Derived Foam Plastics", published Apr. 13, 2004.
Zalobsky et al., "Recommendations on Selection and Use of Cavity Reinforcement Materials" Proceeding of the 1999 Noise and Vibrations Conference.
Weber et al., "Requirements for Improved Performance of Specialty Sealing and Bonding Materials for Automotive Applications", SAE 2000 World Congress, Mar. 6-9, 2000.
Liu et al., "Validation of Epoxy Foam for Structural and Crash Application", 2004 SAE World Congress, Mar. 8-11, 2004.
Schulenburg et al., "Structural Adhesives—Improvements in Vehicle Crash Performance", 2004 SAE World Congress, Mar. 8-11, 2004.
Casey et al., Expandable Epoxy Foam: A Systematic Approach to Improve Vehicle Performance:, 2004 SAE World Congress, Mar. 8-11, 2004.
Copending U.S. Appl. No. 10/783,326, filed Feb. 20, 2004.
Copending U.S. Appl. No. 11/089,712, filed Mar. 25, 2005.
Product Literature for Structural Adhesives and Structural Specialty Products.
International Search Report dated Nov. 28, 2005. PCT/US05/014385.

* cited by examiner

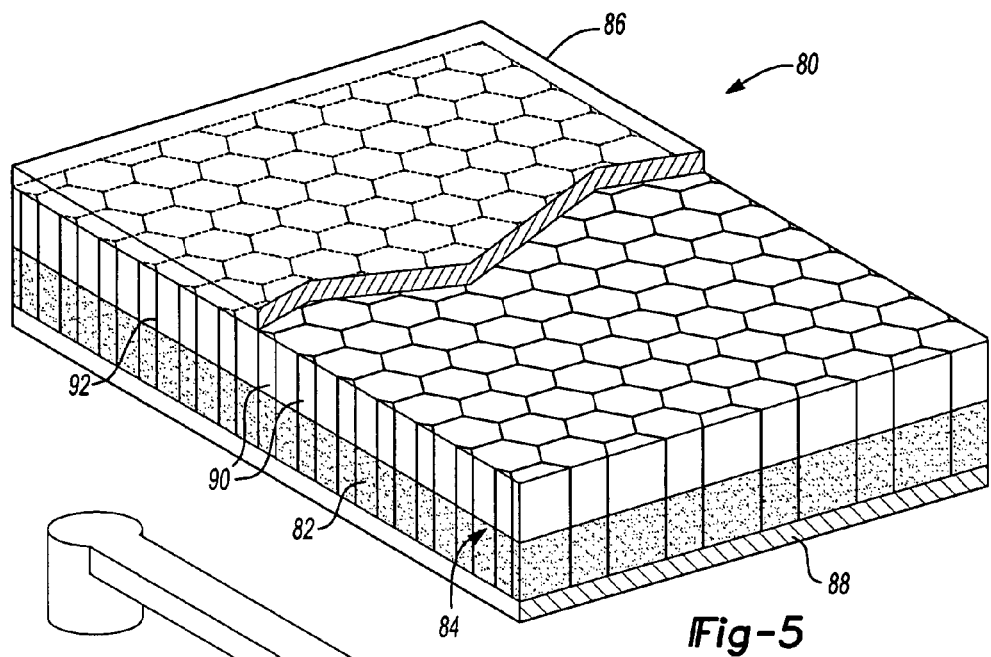
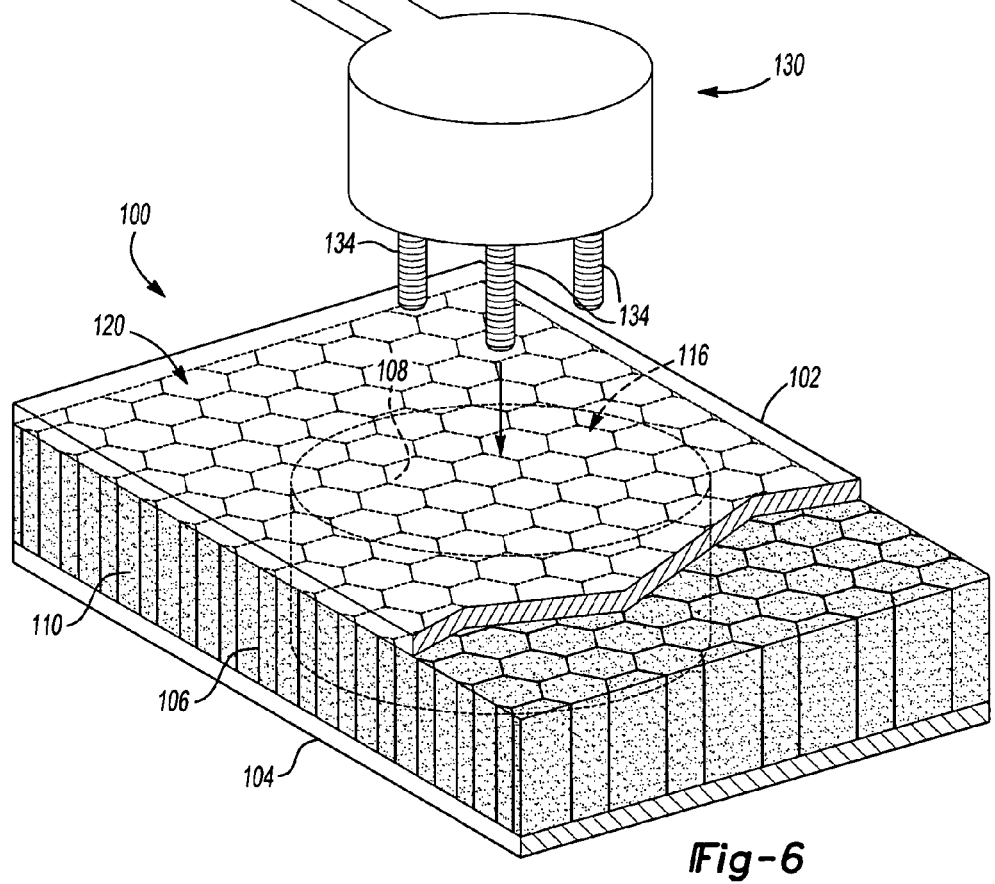

PANEL STRUCTURE

CLAIM OF BENEFIT OF FILING DATE

The present application is a continuation of application Ser. No. 11/151,957 filed on Jun. 14, 2005 now U.S. Pat. No. 8,070,994, which is a non-provisional of application Ser. No. 60/581,190 filed Jun. 18, 2004 and the present application claims the benefit of the filing dates of both prior applications, the contents of which are hereby incorporated by reference in their entirety.

FIELD OF THE INVENTION

The present invention relates generally to a panel structure that incorporates one or more panels and a material for providing reinforcement, baffling, sealing, sound absorption, damping or attenuation, thermal insulation, combinations thereof or the like.

BACKGROUND OF THE INVENTION

For many years, industry, and particularly the transportation industry, has been concerned with designing innovative structures that assist in providing functional attributes such as reinforcement, baffling, sealing, sound absorption, damping or attenuation, thermal insulation, combinations thereof or the like to articles of manufacture such as airplanes, automotive vehicles, buildings, furniture or the like. In the interest of continuing such innovation, the present invention provides a panel structure having one or more desirable functional attributes

SUMMARY OF THE INVENTION

Accordingly, the present invention provides a panel structure having at least one panel and a material associated with the panel. In one desirable embodiment, the panel structure includes a first panel and a second panel with the material disposed therebetween. Typically, the material provides reinforcement, baffling, sealing, sound absorption, damping, attenuation, thermal insulation, combinations thereof or the like to the panel structure and/or an article of manufacture incorporating the panel structure. In one particular embodiment, the panel structure has been particularly useful when employed for interior portions of transportation vehicles and particularly aerospace vehicles such as airplanes.

BRIEF DESCRIPTION OF THE DRAWINGS

The features and inventive aspects of the present invention will become more apparent upon reading the following detailed description, claims and drawings, of which the following is a brief description:

FIG. 5 is a perspective view of an additional or alternative embodiment of a panel structure according to the present invention.

FIG. 6 is a perspective view of another additional or alternative embodiment a of a panel structure according to the present invention.

DETAILED DESCRIPTION OF THE INVENTION

The invention relates to a panel structure of an article of manufacture and a method of forming the panel structure. The panel structure includes at least one panel and a material associated with (e.g., laminated or layered with) the at least one panel. Typically, the material is disposed between a first panel and second panel, although not necessarily required. The material is also typically a functional material that provides reinforcement, baffling, sealing, sound absorption, sound damping, sound attenuation, thermal insulation, combinations thereof or the like to the panel structure and/or to an article of manufacture incorporating the panel structure.

It is contemplated that the panel structure may be employed in a variety of articles. Exemplary articles include household or industrial appliance (e.g., dishwashers, washing machines, dryers or the like), furniture, storage containers or the like. In one embodiment, the panel structure is employed in a transportation vehicle (e.g., an automotive vehicle, a boat, an airplane or the like). When used for a transportation vehicle, the panel structure has been found to be particularly useful as an interior panel structure (e.g., a panel exposed to an interior cabin portion of the vehicle). In one embodiment, the panel structure has been found particularly useful as an interior panel structure of an aerospace vehicle (e.g., an airplane). As such, the panel structure of the present invention is primarily discussed in relation to an airplane, however, the invention should not be so limited unless otherwise stated.

Figure 1:
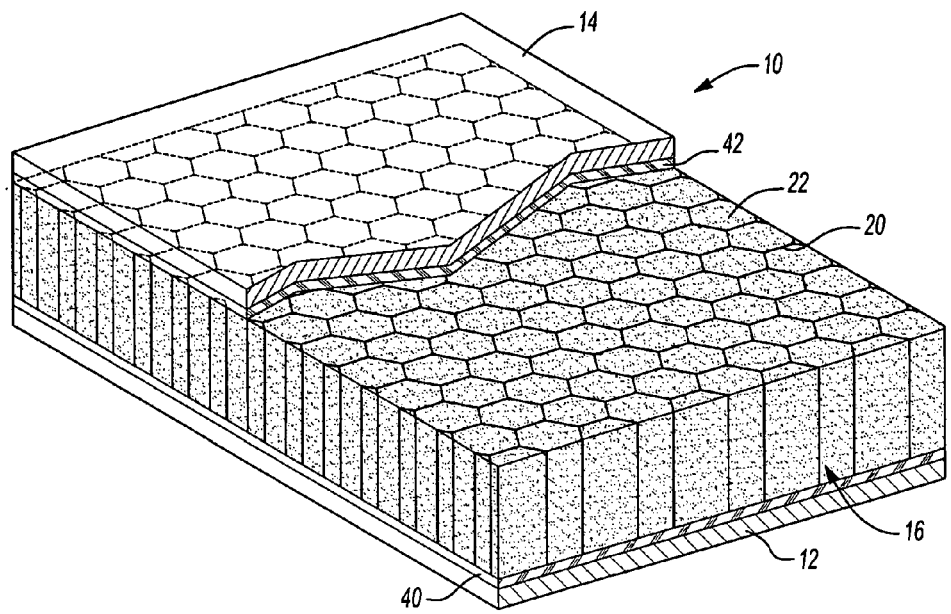
FIG. 1 is a perspective partially cut-away view of a portion of an exemplary panel structure formed in accordance with an aspect of the present invention.

Referring to FIG. 1, there is illustrated an exemplary embodiment of an interior panel structure 10 of an airplane in accordance with an aspect of the present invention. The panel structure 10 includes a first or inner panel 12 opposite a second or outer panel 14. The panel structure 10 also includes a composite 16 intermediate the first panel 12 and second panel 14.

It should be understood that the panels (e.g., the first and second panels 12, 14) of the present invention may be as thick or thin as needed or desired. For exemplary purposes, the thickness of the panels is typically at least about 0.03 mm but may be less, more typically at least about 0.2 mm and even more typically at least about 0.4 mm and is typically less than about 0.5 cm but may be greater, typically less than about 3 mm and even more typically less than about 1 mm.

The first panel 12 and the second panel 14 are shown as being substantially planar, however, it is contemplated that the first and second panels 12, 14 may be contoured as desired or needed. Typically, such contouring will depend upon the location that the panels 12, 14, the panel structure 10 or both are to be installed within the airplane or other article of manufacture.

The first panel 12 and second panel 14 may be formed of a variety of materials. Exemplary materials include metals, polymeric materials (e.g., plastics, elastomers, thermorplastics, thermosets, combinations thereof or the like). The materials of the panels may also be reinforced with minerals, fibrous materials (e.g., glass, carbon or nylon fibers), combinations thereof or the like. In one embodiment, the first panel 12 is formed of fiberglass/plastic composite and the second panel 14 is formed of a metal or metal alloy.

The composite 16, as shown, includes a support 20 and a material 22 (e.g., a matrix material or functional material) integrated with the support 20. It should be noted, however, that it is contemplated that the panel structure 10 may include only the material 22 without the support 20. The support 20 may be formed in a variety of shapes and configurations such as corrugations, lattice structures or the like. In the particular embodiment shown, the support 20 is a honeycomb structure defining a plurality of openings into which the material 22 has been placed or located.

When included, the support is typically formed of a polymeric material such as a thermoplastic or thermoset polymeric material, which may or may not be reinforced with minerals or fibrous materials (e.g., glass, carbon or nylon fibers). It is contemplated, however, that the support may be formed of several additional or alternative materials as well such as metals, fibrous materials (e.g. cardboard, paper materials), combinations thereof or the like which may be coated or uncoated.

The Material

The material 22 typically provides the panel structure 10 (or the article of manufacture including the panel structure) with reinforcement, baffling, sealing, sound absorption, damping or attenuation, thermal insulation, combinations thereof or the like. Thus, the material may exhibit relatively high strength to weight ratios, relatively high sound attenuation characteristics, combinations thereof or the like.

The material 22 is typically selected so as to be activatible under a desired condition. As used herein, activatable means that the material softens (e.g, melts), cures, expands, foams or a combination thereof upon exposure to a condition or upon the combination of particular chemicals (e.g., 2-component materials). Typically, the material, upon activation, can wet, and preferably bond to adjacent surfaces (e.g., the surfaces provided by the panels 12, 14, the support 20 or a combination thereof).

In a preferred embodiment, typically for reinforcement, the material has a post-cure glass transition temperature that is greater than any temperatures to which the material may be exposed while in its intended environment of use (e.g., in an airplane or automotive vehicle). Exemplary post-cure glass transition temperatures may be greater than about 80 degrees Celcius and more preferably greater than about 100 degrees Celsius. Other desired characteristics of the material might include good adhesion retention and degradation resistance particularly in adverse environments such as highly variable temperature environments, high dynamic activity environments, combinations thereof or the like. For particular embodiments (e.g., where damping or sound absorption is desired), the material may stay in a softer or goopy state or it may become more solid particularly if it has a lower post-cure glass transition temperature.

The material may be a thermoplastic, a thermoset or a blend thereof. According to one embodiment, the material is as an epoxy-containing material, an ethylene-containing polymer, an acetate or acrylate containing polymer, or a mixture thereof, which when compounded with appropriate ingredients (typically a blowing agent, a curing agent, and perhaps a filler), typically expands, cures or both in a reliable and predictable manner upon the application of heat or another activation stimulus. Thus, according to one embodiment, an exemplary material may be a heat-activated and/or epoxy-based resin having foamable characteristics. Of course, the material may be activated by other conditions or stimuli. Generally, it is contemplated that, particularly for higher expansion materials, the activatable material may include or be based upon an elastomer (e.g., rubber), an acetate, an acrylate or combinations thereof.

From a chemical standpoint for a thermally-activated material, such material is usually initially processed as a thermoplastic material before curing. After curing, the material typically becomes a thermoset material that is fixed and incapable of any substantial flow. Examples of preferred formulations that are commercially available include those available from L&L Products, Inc. of Romeo, Mich., under the designations L-0502, L-0504, L-1066, L-2105, L-2663, L-5204, L-5206, L-5207, L-5208, L-5214, L-5218, L-5222, L-5248, L-7102, L-7220, L-8000, L-8100 or combinations thereof. It is also contemplated that the material may have a fiberglass or other fabric material integrated to one or more sides of the material and/or within the material.

The material 22 may be formed using a variety of processing techniques, machines and the like. Possible processing techniques for the preferred materials include injection molding, blow molding, thermoforming, extrusion with a single or twin screw extruder or extrusion with a miniapplicator extruder. The material may also be formed as a blown or a cast film, particularly prior to expansion.

Though preferred materials are disclosed other suitable material may be used in conjunction with the present invention. The choice of the material 22 used will typically be dictated by performance requirements and economics of the specific application and requirements. Examples of other possible materials include, but are not limited to, polyolefins, copolymers and terpolymers with at least one monomer type an alpha-olefin, phenol/formaldehyde materials, phenoxy materials, polyurethanes typically with high glass transition temperatures (including polyureas), and mixtures or composites thereof (optionally including solid or porous metals). See also, U.S. Pat. Nos. 5,766,719; 5,755,486; 5,575,526; 5,932,680 (incorporated herein by reference).

In applications where the material is a heat activated material, such as when a thermally melting, expanding, curing and/or foaming material is employed, an important consideration involved with the selection and formulation of the material can be the temperature at which the material activates, cures or both. In most applications, it is undesirable for the material to activate at room temperature or the ambient temperature in a production or assembly environment. Typically, it is desirable for the material to activate at higher processing temperatures. Typical activation temperature[s] is at least about 120° F. or less, more typically at least about 190° F., still more typically at least about 230° F. and even more typically at least about 265° F. and typically less than about 600° F. or greater, more typically less than about 450° F. and even more typically less than about 350° F. and still more typically less than about 275° F. Exposure to such temperatures typically occurs for a period of time that is at least about 10 minutes or less, more typically at least about 20 minutes and even more typically at least about 30 minutes and typically less than about 300 minutes or greater, more typically less than about 180 minutes and even more typically less than about 90 minutes.

Although the material 22 may be heat activated, it may be otherwise additionally or alternatively activated by other stimuli to cure, expand, bond, combinations thereof or the like. Without limitation, such material may be activated by alternative stimuli such as, pressure, moisture, chemicals, ultraviolet radiation, electron beam, induction, electromagnetic radiation or by other ambient conditions. As particular examples, the material may be a two-component adhesive material that expand, cure, adhere or a combination thereof upon adding one component to the other. Examples of first component/second component materials include epoxy/amine materials and epoxy/acid materials.

Manufacture

The panel structure of the present invention may be formed according to a variety of protocols. The material may be applied directly to the panels, the support or both. Thereafter, the material may be activated to soften, cure, expand or a combination thereof to wet and adhere the material to the panels, the support or both. It is also contemplated that the material may be pre-activated and subsequently applied to the panels, the support or both. Further, it is contemplated that one or more adhesives may be employed for attaching the panels, the material, the support or combinations thereof to each other.

When the material 22 is incorporated with a support 20 having openings such as the honeycomb structure of FIG. 1, various different techniques may be used to provide the material 22 to the openings. In one embodiment, and referring to FIG. 2, masses 30 of the material 22 may be provided on a surface 34, which may be part of one of the panels 12, 14, of the panel structure 10 or of another panel, according to the pattern of openings of the support 20. Then, the masses 30 are located within the openings of the support 20, while they remain upon the surface 34 by bringing the surface 34 and support 22 closer to each other. In such an embodiment, the masses 30 may be provided manually or automatically to the surface 34. For instance, the masses 30 may be provided to the surface 34 using an extruder (e.g., using extrude-in-place techniques). It may also be possible to manually or automatically (e.g., with an extruder and or extrude-in-place techniques) apply masses 30 of the material 22 directly into the opening of the support 20. Techniques for extruding such materials in these embodiments are disclosed in commonly owned U.S. Pat. No. 5,358,397 and U.S. patent application Ser. No. 10/342,025, filed Jan. 14, 2003, titled "Method and Apparatus for Applying Flowable Materials", both of which are incorporated herein by reference for all purposes.

Figure 2:
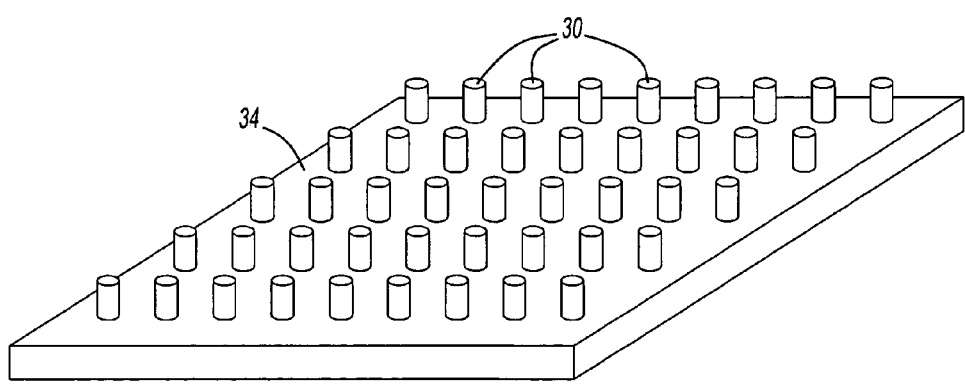
FIG. 2 is a perspective view of a sheet with masses of material distributed thereon according to an exemplary aspect of the present invention.

In an alternative embodiment, and referring to FIG. 2, it is contemplated that both the panel may be formed of a material (e.g., an expandable material) as well as the masses 30 of material. In such an embodiment the panel of material would typically serves to adhere the masses and the support to one of the panels 12, 14.

In another embodiment, the material 22 is applied to the support 20 by dispensing multiple (e.g. 3, 6, 20, 100 or more) masses (e.g., as small pellets or as a powder) of the material 22 into each of the openings of the support 20. Such masses may be poured, sprinkled or otherwise dispensed into the openings of the support 20.

The panels 12, 14 may be attached to the support 20, the material 22 or both before, during or after activation of the material 22. Thus, in one embodiment, the material 22 is activated to soften, expand, cure or a combination thereof followed by attaching the panels 12, 14 to the material. In the embodiment illustrated, the material 22 is activated to soften (e.g., melt), expand and wet the support 20 while simultaneously and/or thereafter to cure and adhere to the support 20 thereby forming the composite 16. Thereafter, the panels 12, 14 are respectively adhered to opposite sides of the composite 16 with adhesive layers 40, 42.

In another embodiment, one or both of the panels 12, 14 are placed adjacent the material 22, the support 20 or both (e.g., placed adjacent opposite sides of the material 22 and/or the support 20). Then, the material 22 is activated to soften (e.g., melt), expand and wet the support 20 and one or both of the panels 12, 14 while simultaneously and/or thereafter curing and adhering to the support 20 and one or both of the panels 12, 14. In such an embodiment, the material 22, the composite 16 or both can be attached to the panels 12, 14 without the additional adhesive layers 40, 42, although such adhesive layers may be additionally included. Also, in such an embodiment, temporary attachments (e.g., fasteners) may be employed to located the panels 12, 14, the material 22 and, if used, the support 20 relative to each other at least until activation of the material 22.

Figure 4A:
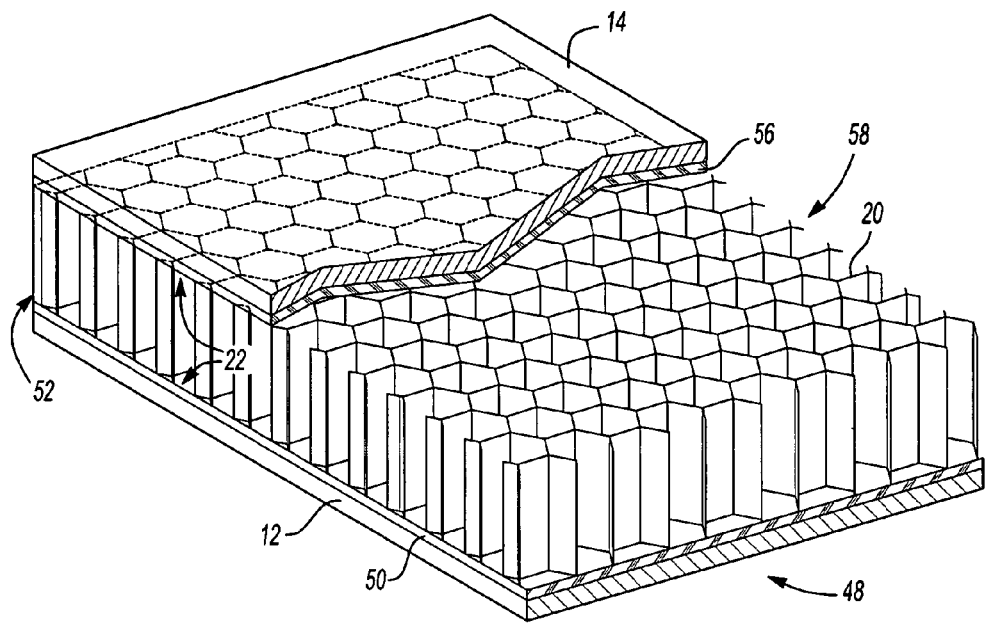
FIG. 4A is a perspective partially cut-away view of a portion of an exemplary panel structure prior to activation of a material of the structure.
Figure 4B:
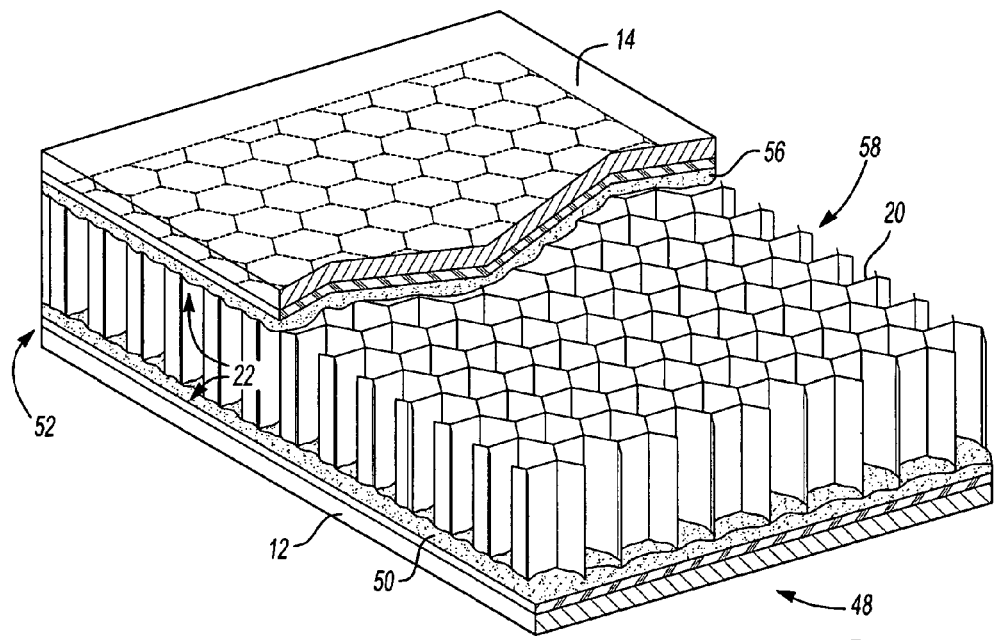
FIG. 4B is a perspective partially cut-away view of the portion the exemplary panel structure of FIG. 4A after activation of the material of the structure.

In one particular embodiment, referring to FIGS. 4A and 4B, there is a panel structure 48 with a first layer 50 of the material 22 positioned between the first panel 12 and a first side 52 of the support 20 and a second layer 56 of the material 22 positioned between the second panel 14 and a second side 58 of the support 20.

Once assembled, typically either automatically, manually or a combination thereof, the layers 50, 56 of material 22 are activated to soften, expand and cure. As can be seen, the layers 50, 56 wet and adhere to both the support 20, particularly the sides 52, 58 of the support and to side surface of the panels 12, 14. The layers 50, 56 can also expand into and fill at least a portion of the opening of the support 20. Advantageously, the layers 50, 56 may be able to provide reinforcement, structural integrity, sound and/or vibration dampening, sound absorption or a combination thereof to the panel structure 48. While, the material 22 in FIGS. 4A and 4B is not shown as being located in the more central openings of the support 20 as discussed in previous embodiments, it is contemplated that such material may additionally be so located and employed as previously described.

In a preferred embodiment, the material 22 of the panel structure is heat activated in a panel press. For activation, the components (i.e., the material 22, the layers 52, 56, the support 20 and the panels 12, 14 or a combination thereof) of the panel structure may be assembled as described above or otherwise. Thereafter, the panel structure is fed to a panel press where it experiences temperatures that are typically above about 150° F., more typically above about 200° F. and even more typically above about 265° F. and below about 550° F., more typically below about 420° F. and even more typically below about 350° F. Such exposure is typically for a time period of at least about 10 minutes, more typically at least about 30 minutes and even more typically at least about 60 minutes and less than about 360 minutes more typically less than about 180 minutes and even more typically less than about 90 minutes. While in the press, a pressure is typically applied to the panel structure urging the components (i.e., the material 22, the layers 52, 56, the support 20 and the panels 12, 14 or a combination thereof) of the panel structure toward each other. Advantageously, typically for reinforcement, the material can provide more thorough adhesion to the support.

It is additionally contemplated that other additional or alternative techniques may be used to assist in the formation of the panel structure. Such techniques can include vacuum forming and baking, autoclaving and pressure, others or combinations thereof. Such techniques can assist in forming panels with contours. Heats and time period for these techniques can be the same as those discussing above or may be different depending upon the activatable material used.

Application

As discussed, the panel structure 10 may be used in several different articles of manufacture such as transportation vehicles (e.g., automotive vehicles), buildings, furniture or the like. Typically, although not required, the panel structure is employed for forming the interior of one of these articles of manufacture. In such an embodiment wherein the panel structure includes at least two panels, at least one panels of the panel structure is typically exposed to and/or at least partially defines an inner open area of the article while another panel of the panel structure is closer to a body of the article. For example, in a building, the inner or first panel would typically be exposed to and/or define the interior of a room of the building while the outer or second panel would typically be closer to the outer building material (e.g., brick, siding or the like) of the building. As another example, in an automotive vehicle, the inner or first panel would typically be exposed to and/or at least partially define an interior cabin of the vehicle while the outer or second panel would typically be closer to the body of the vehicle.

Figure 3:
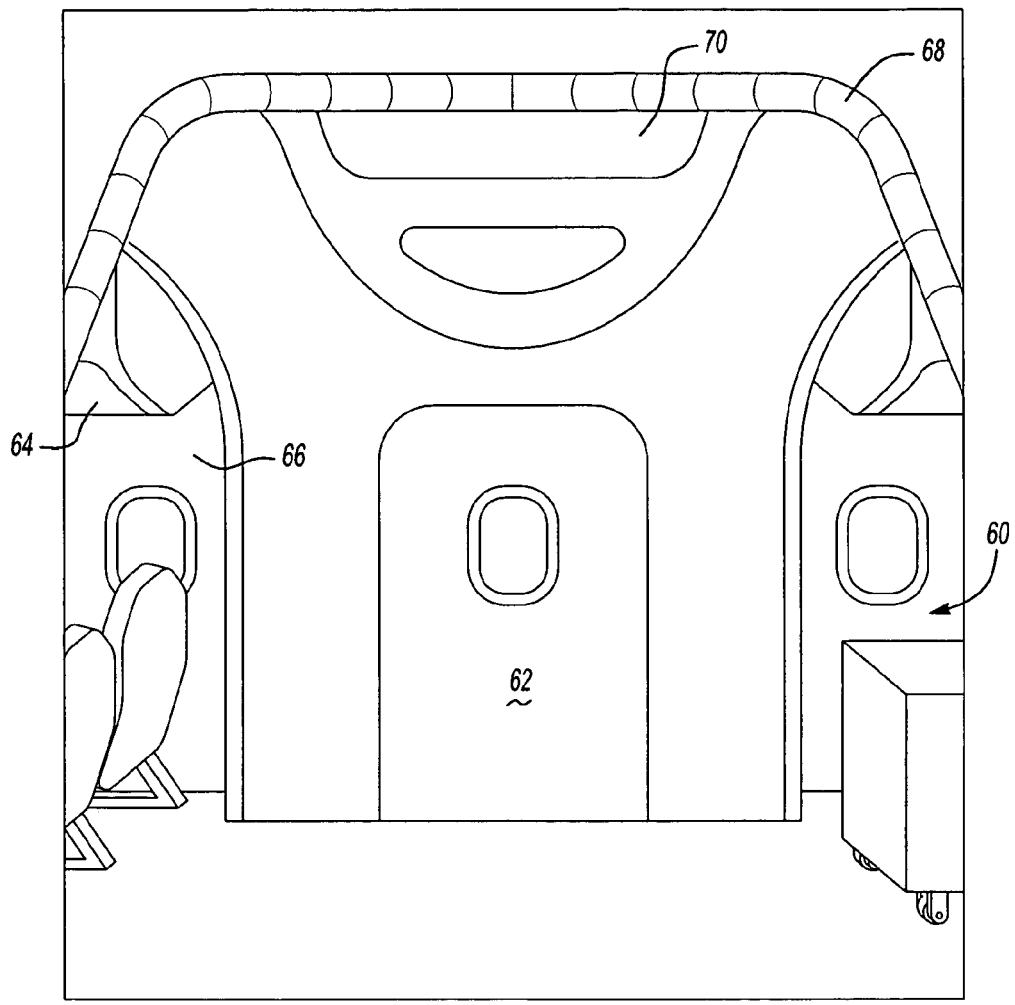
FIG. 3 is a perspective view of an exemplary interior of an airplane in accordance with an aspect of the present invention.

Referring additionally to FIG. 3, it is contemplated that the panel structure 10 can be employed in several locations within the interior 60. For example, and without limitation, the panel may form part or the entirety of a door 62, an overhead storage compartment 64, a side panel 66, an archway 68, a ceiling panel 70, combinations thereof or the like. The panel may also be employed in an airplane wing, floor structure or the like.

When the structure 10 is employed within an airplane the first or inner panel 12 will typically be exposed and/or at least partially define the interior cabin 60 of the airplane. The second or outer panel 14 is typically closer to the fuselage of the airplane. Of course, the panels may be reversed. Moreover, the panel may be located away from the fuselage and may or may not be exposed to the interior cabin of the plane. For example, the panel may be completely enclosed (e.g., within an interior door of a plane) or may be covered with carpet (e.g., as in a floor panel of a plane). It should be understood that the panel (e.g., the first panel) that is typically closest to the interior cabin 60 may be covered by an aesthetic covering such as paint, wallpaper, a plastic fascia, cloth, leather, combinations thereof or the like and may still define the interior cabin 60.

The panel structure 10 may be attached to the fuselage of the airplane according to a variety of techniques. Generally it is contemplated that the second or outer panel 14 may be connected directly or indirectly connected or attached to the fuselage and may be attached thereto with fasteners, adhesives, interference fits, support structures, combinations thereof or the like.

When the materials of the present invention are integrated into the support as shown and discussed in relation to FIG. 1, the materials can provide significant acoustical damping properties to the panels in addition to the other properties imparted to the panels. When, the materials are used on opposing sides of the support, as shown and discussed in relation to FIGS. 4A and 4B, the materials can provide significant structural integrity to the panels in addition to the other properties imparted to the panels. As such, it should be understood that the material integrated into the support may be different or may be the same as the material used to adhere to the opposing sides. For example, where the materials are different, it is contemplated that the material integrated into the support may volumetrically expand at least 10%, more typically at least 30% and even more typically 100% more than the expansion of the material on the sides. As used herein, a material that expands to a volume that is 210% of its original unexpanded volume volumetrically expands 10% more than a material that expands to 200% of its original volume, and similar calculations may be made for the other percentages. Generally, higher expanding materials can be more specifically tailored for acoustical dampening while the lower expanding material can be tailored far providing structural integrity.

As an addition or alternative to the previous embodiments, it is contemplated that that activated or activatable material, the support or a combination thereof may fill none, a portion, a substantial portion or substantially the entirety of a volume between two panels. The amount of the volume filled may depend upon considerations such desired strength, desired sound absorption or the like.

In FIG. 5, one embodiment of a panel structure 80 is illustrated as having an activated material 82 (e.g., a foam) that fills a portion of a volume 84 between a first panel 86 (e.g., a resistive face sheet) and a second panel 88. In the illustrated embodiment, the activated material 82 is located within openings 90 of a support 92. Typically, although not required, the material 82 (e.g., the foam and the voids or cells defined by the foam), the support 92 or both fill at least 5%, more typically at least 15% and even more typically at least 30% of the volume between the panels. It is also typical, although not required, for the material 82, the support 92 or both to fill less than 90%, more typically less than 75% and even more typically less than 60% of the volume between the panels.

The particular embodiment illustrated can, if desired, exhibit a relatively high degree of sound absorption due to one or more factors such as the materials used for the panel structure, the configuration of the components of the panel structure or other factors. Generally, the panels 86, 88 may be formed of any of the materials discussed herein or other materials. According to one preferred embodiment, however, the first panel 86 is formed of a fabric (e.g., upholstery, felt material, wire mesh) or non-fabric material that includes or is formed substantially entirely of a polymer, fiberglass, natural fiber, metal (e.g., aluminum, steel, magnesium, a combination thereof or the like), metal fibers, combinations thereof or the like, which may be woven into a fabric, molded, extruded or other wise formed or processed. The first panel 86 if typically formed of a material that allows sound waves to pass through it and the material may additionally provide some amount of sound impedance. Generally, it is contemplated that the material of the first panel may or may not be impervious to fluids.

The second panel 88, like the first, may also be formed of any of the suitable materials discussed herein. As one example, the second panel 88, may include or be formed substantially entirely of an epoxy/glass fiber prepreg or composite. The support 92 can also be formed of any of the suitable materials discussed herein. In the illustrated embodiment, the support 92 is a honeycomb structure similar to that described for FIG. 1.

For forming the panel structure of FIG. 5, the activated material may be located within the opening of the honeycomb according to any of the techniques discussed herein. According to one embodiment, activatable material is located adjacent the second panel 88 and expanded or foamed (e.g., by exposure to heat as described herein) into the openings 90 of the support 92 to whatever distance or degree is desired. Preferably, after activation, the activated material 82 occupies a volume that is at least 150%, more typically at least 400% and even more typically at least 800% of the volume occupied by the activatable material prior to activation. Advantageously, such an expansion of the activatable material allows for the activated material 82 to efficiently fill at least part of the volume 84 between the panels 86, 88.

As another addition or alternative to the previous embodiment, it is contemplated that the panel structure of the present invention may include a relatively high strength material throughout or within a region of the panel structure. Advantageously, such a material or region can assist providing structural integrity to the panel structure, particularly at locations where components are attached to the panel structure.

Referring to FIG. 6, an exemplary panel structure 100 is illustrated as having a first panel 102 and a second panel 104. The panel structure 100 also includes support 106 and one or more activated materials 108, 110 between the first panel 102 and the second panel 104. It should be understood that any of the components of the panel structure 100 can be formed of any of the suitable materials discussed herein or others unless otherwise specified. Moreover, the components may be assembled or applied to each other using any of the suitable techniques discussed herein or others, unless otherwise specified.

As can be seen, the panel structure 100 of FIG. 6 includes a relatively high strength region 116 as defined by the dashed line. Although shown as cylindrical, the region 116 may shaped as desired depending upon its intended use. The high strength region 116 is defined by the fact that its activated material 108 has a relatively high strength. For example, the material 108 can have a compressive strength that is at least about 0.7 MPa (but may be less), more typically at least about 1.5 MPa and even more typically at least about 2.5 MPa. If needed, such compressive strength values can be measured according to automotive standard ASTM D-1621. In addition to compressive strength, the material 108 can have a compressive modulus of at least 100 MPa but may be less, more typically at least about 150 MPa and even more typically at least about 200 MPa. Preferably, the activated material 108 of FIG. 6 is a structural foam that has been activated according to techniques already described herein, however, the material 108 may also be selected from the other materials discussed herein or others, unless otherwise specified.

In FIG. 6, the high strength region 116 is surrounded by or adjacent a lower strength region 120, however, it should be understood that the entire panel structure 100 may be a high strength region. The lower strength region 120 is defined by the fact that its activated material 110 has a compressive strength that is less than that of the activated material 108 of the high strength region 116. For example, the compressive strength of the material of the lower strength region can be less than 90%, less that 80% or even less than 60% of the compressive strength of the higher strength region 116.

Generally, for activated materials, the material of the high strength region is formed from an activatable or expandable material having lower expansion percentages than an activatable or expandable material forming the material of the lower strength region. Such relative expansion levels have been discussed above and apply here. It is also contemplated that the lower strength material could be configured as shown and described in relation to FIG. 5. Advantageously, high strength regions such as the region 116 of FIG. 6 are particularly suitable for having one or more components attached thereto. In FIG. 6, a component 130 is illustrated just prior to attachment of the component 130 to the high strength region 116. The component 130 shown is a handle (e.g. a door handle), however it could be any number of different components such as mouldings, pictures, advertisements, mirrors, other components, combinations thereof or the like. Typically, the component will include one or more fasteners for attaching the component to the panel structure. In FIG. 6, the component 130 includes a plurality of fasteners 134 (e.g., screws, blind rivets, clips or the like) which may be directly or indirectly attached to (e.g., threadably fastened to, inserted into or the like) the high strength region 116 including one or any combination of the activated material 108, the panels 102, 104 and/or the support 106.

As another addition or alternative to the previous embodiments, it is contemplated that the panel structure of the present invention may include one or more relatively large openings (e.g., through-holes, cavities or the like) that are suitable for receipt of one or more components. For example, panel structures of the present invention may need to have opening suitable for receipt of components such as wiring, handles (e.g., closure panel handles), fasteners, trim, windows, signs, combinations thereof or other components.

Figure 7:
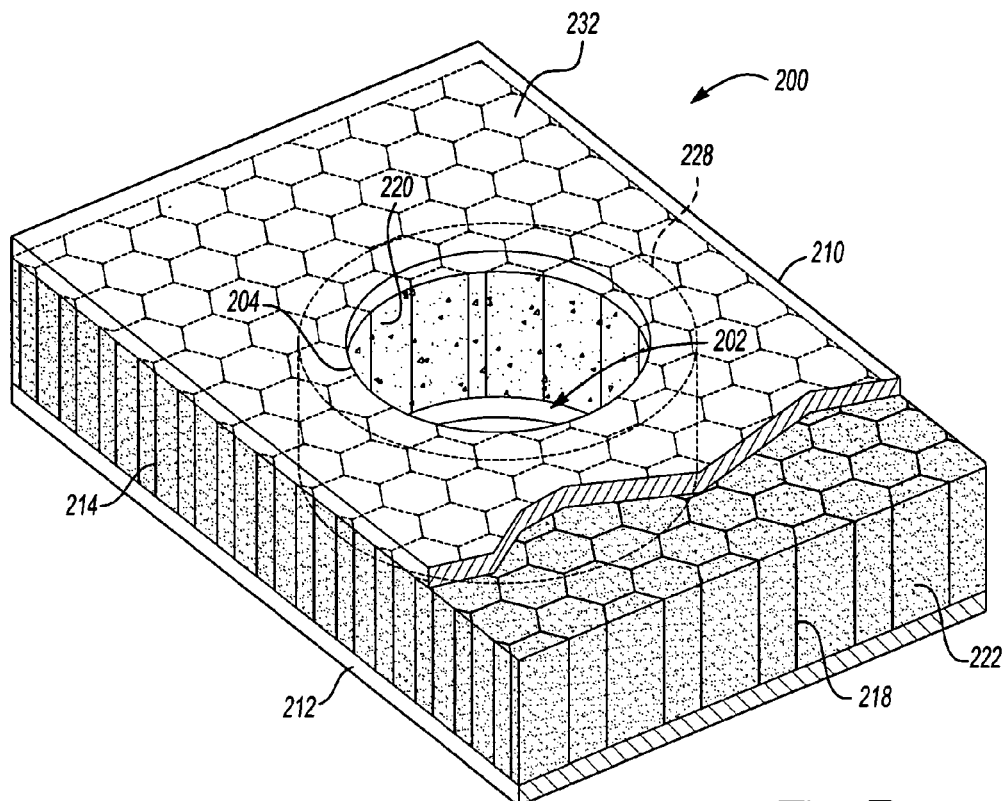
FIG. 7 is a perspective view of another additional or alternative embodiment a of a panel structure according to the present invention.

Referring to FIG. 7, an exemplary panel structure 200 according to the present invention is illustrated as having at least one relatively large opening 202. As used herein, the term relatively large opening in intended to mean any opening having a volume located between one or more surfaces defining the opening wherein that volume is at least 2 cm$^3$, more typically at least 4 cm$^3$ and even more typically at least 6 cm$^3$. In the illustrated embodiment illustrated, the opening 202 is a through-hole with an annular surface 204 defining the opening 202 as disc shaped volume between or surrounded by the annular surface 204. It is contemplated that the volume of the opening may be as large as needed. However, it is generally desirable that such volume does not exceed 50 cm$^3$, more typically does not exceed 30 cm$^3$ and even more typically does not exceed 15 cm$^3$.

As shown, the panel structure 200 is comprised of a first panel 210 and a second panel 212 and a composite 214 therebetween. The composite 214 includes a support 218 and a first material 220 (e.g., activated or activatable material such a foam or foamable) and optionally, a second material 222. It will be understood that the panel structure 200 and its components (i.e., the panels 210, 212, the support 218 and the materials 220, 222) may be formed of any of the suitable materials discussed herein and may be configured according to any of the other embodiments described herein unless otherwise specified. It should also be understood that the components of the panel structure may be assembled according to any of the embodiments described herein unless otherwise specified.

The illustrated panel structure 200 also includes a peripheral region 228 that extends adjacent to the opening 202. As used herein, a peripheral region of the panel structure is intended to mean a region of the panel structure that extends from adjacent the opening 202 (e.g., firming one or more surfaces defining the opening) into the actual panel structure. Typically, although not required, a peripheral region (e.g., the entirety of the peripheral region) extends from adjacent the opening and into the panel structure a distance of at least 1 cm, more typically at least 2 cm and even more typically at least 3 cm. While it is contemplated that the peripheral region may extend from the opening any distance into the panel structure, it may be desirable for the region to extend less than 30 cm, more typically less than 25 cm and even more typically less than 10 cm into the panel structure. Generally, the peripheral region may extend substantially continuously, intermittently or only adjacent a portion of the opening.

Typically, the material 220 of the peripheral region 228, which may be a foam or any of the other suitable materials discussed herein, has one or more relatively high strength characteristics. For example, the material can have a compressive strength that is at least about 0.7 MPa or lower, more typically at least about 1.5 MPa and even more typically at least about 2.5 MPa. Such values can be measured according to automotive standard ASTM D-1621. Additionally, the material can have a compressive modulus of at least 100 MPa or lower, more typically at least about 150 MPa and even more typically at least about 200 MPa. Advantageously, the material 220 of the peripheral region 228 can assist in providing structural integrity to the panel structure 200, particularly at locations where components may extend into and/or through the opening 202 of the structure 202.

While not required, it is contemplated that a secondary region 232 of the panel structure 200 will include the second material 222, which has a strength that is less than the strength of the first material 220. For example, the second material 222 may have a compressive strength that is less than 90% more typically less than 70% and even more typically less than 50% of the compressive strength of the first material 220 as determined above.

While the peripheral region of FIG. 7 has been discussed primarily in relation to relatively large openings, it is contemplated that such a peripheral region may be located at any ending region (e.g., a side, edge, border or the like) of the panel structure. For example, the peripheral region could be the outer border of a door or could be at the edge of a panel defining an archway or doorway or others. Thus, the peripheral region is typically adjacent to open space, although not necessarily required. It should additionally, be understood that a peripheral region can be a high relatively strength region and vice versa.

Figure 8:
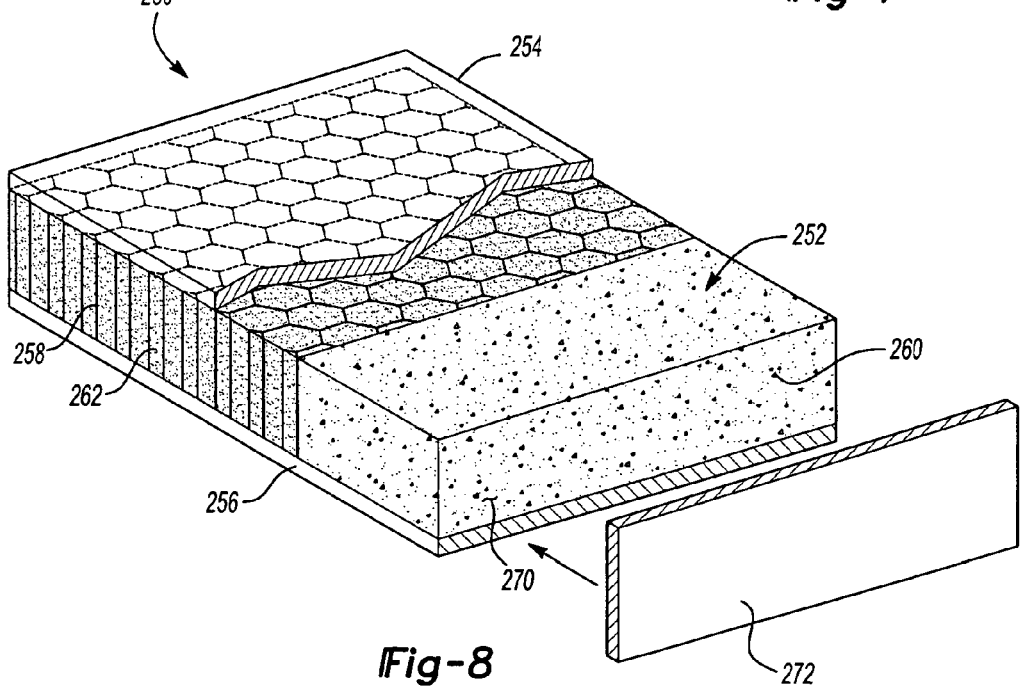
FIG. 8 is a perspective view of another additional or alternative embodiment a of a panel structure according to the present invention.

As yet another addition or alternative to the previous embodiments, it is contemplated that a peripheral region may be formed substantially entirely of activated material without a support. In FIG. 8, a panel structure 250 is illustrated with a peripheral or relatively high strength region 252.

The exemplary panel structure 250 is illustrated as having a first panel 254 and a second panel 256 and a support 258 and one or more activated materials 260, 262 between the first panel 254 and the second panel 256. It should be understood that any of the components of the panel structure 250 can be formed of any of the suitable materials discussed herein or others. Moreover, the components may be assembled, configured or applied to each other using any of the suitable techniques discussed herein or others, unless otherwise specified.

The activated material 260 of the peripheral region 252 of the panel structure 250 extends substantially continuously between the panels 254, 256. The peripheral region 252 is like previously discussed peripheral regions in that the activated material 260 can have similar or same sizes, strengths and configurations as compared to the previously discussed peripheral regions. However, in the embodiment depicted, the peripheral region 252 is without a support or, stated another may, the support 258 of the panel structure 250 stops prior to entry and/or does not extend into the peripheral region 252.

The peripheral region 252 of FIG. 8 can be formed according to any of the techniques discussed herein or others. In one embodiment, an activatable material is located within the peripheral region 252 and activated to expand and/or foam such that the material adheres to the panels 254, 256 and forms the activated material 260 (e.g., structural foam) of the panel structure 250. The activatable material may be located in the peripheral region 252 between the panels 254, 256 using techniques such as manual or automatic placement of an insert formed of the activatable material into the region 252. Alternatively, the activatable material could be extruded or molded into the peripheral regions.

According to one embodiment, it is preferable for the activated material 260 to provide a relatively smooth edge or side surface 270 of the panel structure 250. Such a surface may be formed by machining (e.g., sanding) the activated material 260 after expansion to form the surface 270. Alternatively, such a surface may be formed by placing a barrier 272 adjacent the peripheral region such that the activatable material, during expansion, contacts and conforms to the barrier 272. Then, upon removal of the barrier 272, the surface 270 is relatively smooth. Of course, such surface 270 could include contours and still be considered relatively smooth. Preferably, the barrier 272 provides a non-stick surface such that the activated material 260 does not adhere to the barrier 272 with a high degree of strength during formation of the surface 270.

It should be understood that the panel structure 250 may or may not have a lower strength region 278 in the same manner as the panel structures 100, 200 of FIGS. 6 and 7. Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. An interior panel structure of a transportation vehicle, comprising:
    a first panel formed at least partially of a woven prepreg thermoset material that cures when exposed to temperatures above 230° F.;
    a second panel formed at least partially of a porous material that allows sound waves to pass through the second panel, the second panel being an outer panel that is closer to a body of the transportation vehicle than the first panel while the first panel is closer to an interior cabin of the transportation vehicle; and
    a heat-activated foamable elastomeric material intermediate the first panel and the second panel, the elastomeric material foaming at temperatures above 230° F.

and whereby after expansion the elastomeric material is a foam material that wets and bonds to one or more adjacent surfaces;

wherein space is formed between the foam material and the first panel; and wherein the panel structure, when assembled and in use, provides sound absorption, damping, or attenuation by virtue of the sound waves passing through pores of the porous material of the second panel and into the foam material and the space between the foam material and the first panel.

2. A panel structure as in claim 1, wherein the transportation vehicle is an airplane and the body of the transportation vehicle is a fuselage of the airplane.

3. A panel structure as in claim 1, wherein a honeycomb structure is located between the first panel and second panel and receives the elastomeric material, the honeycomb structure including a plurality of openings.

4. A panel structure as in claim 3, wherein the elastomeric material adheres the honeycomb structure to only one of the first panel and second panel.

5. A panel structure as in claim 3, wherein the elastomeric material adheres the honeycomb structure to the first panel upon foaming.

6. A panel structure as in claim 1, wherein the panel structure is adapted for being located in a heat press so that the woven prepreg thermoset material cures and the elastomeric material foams.

7. A panel structure as in claim 5, wherein no further adhesive is used to bond the elastomeric material to the first panel and the honeycomb structure.

8. A panel structure as in claim 1, wherein the first panel is formed of an epoxy/glass composite.

9. A panel structure as in claim 1, wherein the panel structure is assembled prior to foaming of the elastomeric material.

10. A panel structure as in claim 3, wherein a plurality of spaces are formed between the foam material in each of the plurality of openings and the first panel so that sound becomes absorbed into the plurality of spaces.

11. A panel structure as in claim 3, wherein the elastomeric material is located as a continuous layer in between the honeycomb structure and the first panel.

12. An interior panel structure of a transportation vehicle, comprising:

a first panel formed at least partially of a woven prepreg thermoset material that cures when exposed to temperatures above 230° F.;

a second panel formed at least partially of a porous material that allows sound waves to pass through the second panel, the second panel being an outer panel that is closer to a body of the transportation vehicle than the first panel while the first panel is closer to an interior cabin of the transportation vehicle; and a heat-activated foamable elastomeric material intermediate the first panel and the second panel, the elastomeric material foaming at temperatures above 230° F. and whereby after expansion the elastomeric material is a foam material that wets and bonds to one or more adjacent surfaces;

a honeycomb structure located between the first panel and second panel and including a plurality of openings for receiving the elastomeric material;

wherein the foam material and voids or cells defined by the foam material post-cure fills from about 5% to about 90% of each of the plurality of openings so that a plurality of spaces are formed between the foam material in each of the plurality of openings and the first panel so that sound becomes absorbed into the plurality of spaces.

13. A panel structure as in claim 12, wherein the elastomeric material adheres the honeycomb structure to only one of the first panel and second panel.

14. A panel structure as in claim 12, wherein the elastomeric material adheres the honeycomb structure to the second panel upon foaming.

15. A panel structure as in claim 12, wherein the panel structure is adapted for being located in a heat press so that the woven prepreg thermoset material cures and the elastomeric material foams.

16. A panel structure as in claim 14, wherein no further adhesive is used to bond the elastomeric material to the second panel and the honeycomb structure.

17. A panel structure as in claim 12, wherein the first panel is formed of an epoxy/glass composite.

18. A panel structure as in claim 12, wherein the panel structure is assembled prior to foaming of the elastomeric material.

* * * * *